(12) United States Patent
Agrawal et al.

(10) Patent No.: US 7,509,404 B2
(45) Date of Patent: Mar. 24, 2009

(54) METHODS AND SYSTEMS FOR PARTIAL PAGE CACHING OF DYNAMICALLY GENERATED CONTENT

(75) Inventors: Alok Agrawal, Cambridge, MA (US); Ramkumar Venketaramani, Foster City, CA (US); Leslie Bruce Lowenthal, Los Gatos, CA (US); Lawrence Jacobs, Redwood City, CA (US); Xiang Liu, San Mateo, CA (US); Shehzaad Nakhoda, Palo Alto, CA (US); Zheng Zeng, Foster City, CA (US); Rajiv Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 844 days.

(21) Appl. No.: 09/800,115

(22) Filed: Mar. 5, 2001

(65) Prior Publication Data
US 2002/0004813 A1 Jan. 10, 2002

(51) Int. Cl.
*G06F 15/16* (2006.01)
(52) U.S. Cl. .................... 709/223; 709/217; 707/10; 718/101; 710/52
(58) Field of Classification Search ............... 707/217, 707/9, 10; 718/101, 107; 709/217, 223; 700/9; 710/52
See application file for complete search history.

(56) References Cited

U.S. PATENT DOCUMENTS

| | | | |
|---|---|---|---|
| 5,611,049 A | | 3/1997 | Pitts |
| 5,884,098 A | * | 3/1999 | Mason, Jr. .................... 710/52 |
| 5,898,835 A | * | 4/1999 | Truong ........................ 709/217 |
| 5,931,904 A | | 8/1999 | Banga et al. |
| 5,983,227 A | * | 11/1999 | Nazem et al. ................. 707/10 |
| 5,988,847 A | * | 11/1999 | McLaughlin et al. ........... 700/9 |
| 6,038,033 A | * | 3/2000 | Bender et al. .............. 358/1.16 |
| 6,085,234 A | | 7/2000 | Pitts et al. |

(Continued)

FOREIGN PATENT DOCUMENTS

WO    WO 98/59481    12/1998

OTHER PUBLICATIONS

Bea, WebLogic Server 6.0 With Service Pack, *Using Custom WebLogic JSP Tags (Cache, Process, Repeat)*, pp. 1-7, http://e-docs.bea.com/wls/docs60/jsp/customtags.htm (Web page printed on Mar. 27, 2001.).

(Continued)

*Primary Examiner*—Thanh Tammy Nguyen
(74) *Attorney, Agent, or Firm*—Young Law Firm, P.C.

(57) ABSTRACT

A method of servicing a request for a document over a computer network includes independently caching portions of pages called blocks. Each block includes a reference to a data source and code that is adapted to access the data source and to format the data accessed from the data source. When a request for a page is received over a computer network, one or more of the plurality of blocks defined in the script of the requested document may be retrieved from a cache memory. Any block that is not found in the cache memory is dynamically generated and a copy thereof is stored in the cache memory. The requested page may then be assembled from the page blocks retrieved from the cache memory and/or the dynamically generated page blocks.

52 Claims, 6 Drawing Sheets

U.S. PATENT DOCUMENTS

| | | | |
|---|---|---|---|
| 6,092,215 A * | 7/2000 | Hodges et al. ................. | 714/6 |
| 6,098,064 A | 8/2000 | Pirolli et al. | |
| 6,182,133 B1 | 1/2001 | Horvitz | |
| 6,397,217 B1 | 5/2002 | Melbin | |
| 6,507,891 B1 | 1/2003 | Challenger et al. | |
| 6,553,411 B1 | 4/2003 | Dias et al. | |
| 6,605,120 B1 | 8/2003 | Fields et al. | |
| 6,622,168 B1 | 9/2003 | Datta | |
| 6,742,015 B1 * | 5/2004 | Bowman-Amuah ......... | 718/101 |
| 6,807,550 B1 | 10/2004 | Li et al. | |
| 2001/0052006 A1 * | 12/2001 | Barker et al. ................ | 709/223 |
| 2002/0032701 A1 | 3/2002 | Gao et al. | |
| 2002/0108020 A1 | 8/2002 | Take et al. | |

OTHER PUBLICATIONS

Candan, et al., Enabling Dynamic Content Caching for Database-Driven Web Sites. ACM SIGMOD May 21-24, 2001 Santa Barbara, CA, Copyright 2001 ACM.

Challenger, et al., A Scalable System for Consistently Caching Dynamic Web Data. IBM Research, Yorktown Heights, NY, no dated.

Challenger, et al., A Publishing System for Efficiently Creating Dynamic Web Content. IBM Research, Yorktown Heights, NY, no dated.

Datta, et al., A Comparative Study of Alternative Middle Tier Caching Solutions to Support Dynamic Web Content Acceleration. Proceedings of the 27$^{th}$ VLDB Conference, Roma, Italy, 2001.

Degenaro, et al., A Middleware System Which Intelligently Caches Query Results. IBM Research, Yorktown Heights, NY, Copyright 2000, Springer-Verlag.

Wessels, et al., ICP and the Squid Web Cache, pp. 1-25. Aug. 13, 1997.

Wessels, et al., Internet Cache Protocol (ICP), version 2, pp. 1-9. National Laboratory for Applied Network Research/UCSD, Sep. 1997.

Akamai white paper: Turbo-Charging Dynamic Web Sites with Akamai EdgeSuite, pp. 1-16. www.akamai.com, Sep. 23, 2002. Copyright 2001, Akamai Technologies, Inc.

A Distributed Infrastructure for e-Business-Real Benefits, Measurable Returns, pp. 1-28. www.akamai.com, Sep. 23, 2002. Copyright 2000 and 2001, Akamai Technologies, Inc.

Edge Sides Includes (ESI) Overview, pp. 1-7. www.esi.org, Sep. 23, 2002. Copyright 2001, Oracle Corporation, Akamai Technologies, Inc.

Tsimelzon, et al., Edge Sides Includes ESI-Accelerating E-Business Applications: Language Specification 1.0, pp. 1-12. www.esi.org/language_spec_1-0.html, Sep. 23, 2002. Copyright 2001, Akamai Technologies, Oracle Corporation.

Nottingham, et al., Edge Side Includes ESI-Accelerating E-Business Applications: Edge Architecture Specification, pp. 1-6. www.esi.org/architecture_spec_1-0.html, Sep. 23, 2002. Copyright 2001, Akamai Technologies. Oracle Corporation.

Jacobs, et al., Edge Side Includes ESI-Accelerating E-Business Applications: ESI Invalidation Protocol 1.0, pp. 1-13. www.esi.org/invalidation_protocol_1-0.html, Sep. 23, 2002. Copyright 2001, Oracle Corporation.

Basu, et al., Edge Side Includes ESI-Accelerating E-Business Applications: JESI Tag Library 1.0 Specification: Tags for Edge-Side Includes in JSP, pp. 1-19. www.esi.org/jesit_tag_lib_1-0.html, Sep. 23, 2002. Copyright 2001, Oracle Corporation, Akamai Technologies, Inc.

Bea, WebLogic Server 6.0 With Service Pack, Using Custom WebLogic JSP Tags (Cache, Process, Repeat), http://e-docs.bea.com/wis/docs60/jsp/customtags.htm, printed Mar. 27, 2001 (7 pgs).

Bestavros, "Using speculation to reduce server load and service time on the WWW", Proceedings of the International Conference on Information and Knowledge Management, 1995, XP000829545, pp. 403-410.

Duchamp D: "Prefetching hyperlinks" 2nd Usenix Symposium on Internet Technologies and Systems Proceedings of Technologies and Systems, Boulder, CO, USA, Oct. 11-14, 1999, pp. 127-138, XP002266381.

Duchamp D: "Prefetching hyperlinks" 2nd Usenix Symposium on Internet Technologies and Systems, Proceedings of Technologies and Systems, Boulder, CO, USA, Oct. 11-14, 1999, pp. 127-138.

* cited by examiner

300

```
<Page>

Body(Cacheable block1)

Body(Cacheable block2 )

</Page>
```

```
<Page>
<Tag Extension "caching properties">
Body(Cacheable data block1)
</Tag Extension>

<Tag Extension "caching properties">
Body(Cacheable data block2 )
</Tag Extension>
</Page>
```

*FIG. 4*

METHODS AND SYSTEMS FOR PARTIAL PAGE CACHING OF DYNAMICALLY GENERATED CONTENT

The present application is related to co-pending commonly assigned U.S. patent application Ser. No. 09/932,524 filed on Aug. 17, 2001.

BACKGROUND OF THE INVENTION

1. Field of the Invention

The present invention relates generally to the World Wide Web (hereafter, "Web"). More particularly, the present invention relates to methods and systems for efficiently servicing requests for documents over a computer network.

2. Description of the Related Art

The Web has evolved from being a repository of static files (Hypertext Markup Language (HTML), Graphic Interchange Format (GIF) and the like) to a very dynamic system with Web sites that span the gamut of possibilities, from multimedia sites that broadcast music on demand to e-commerce Web sites linking consumers and businesses or businesses to other businesses. With this evolution in usage, there has been a corresponding change in the nature of the content served by Web sites. Indeed, an increasing number of Web pages served by Web sites, especially e-commerce Web sites and portals, are dynamically generated.

Generating Web pages on demand, in a dynamic fashion, is a very expensive operation, not only in terms of storage and processing time, but also ultimately in terms of money. The program or application logic that generates a dynamic Web page typically must access various data sources, user profile information and complex business rules to generate the Web page. Quite often, generating dynamic pages requires querying data from data-sources such as Relational databases (catalog information), or processing information feeds (like a stock quote feed, for example), which add to the cost of page generation.

There are various mechanisms for implementing application logic for generating dynamic Web pages. One such mechanism utilizes scripts (small embedded programs) based on Common Gateway Interface (CGI), which is a standard way for a Web server to pass a user request for a Web page to application logic and to receive the requested data back to forward to the user. The application logic can be implemented as a separate executable (Practical Extraction and Reporting Language (PERL-see http://www.perl.com) is one of the most popular languages for writing CGI scripts). CGI mechanisms, however, require a new process to be spawned for executing the application executable for each incoming request. Due to the overhead inherent in starting a new process for each request, this mechanism does not readily scale. As a result, Web sites have started looking for alternative mechanisms. Many high traffic Web sites now use mechanisms such as Servlets, JSPs and ASPs. Servlets are programs written in Sun Microsystems, Inc.'s Java language that execute on pooled, non-terminating processes and threads. This promotes highly efficient operation since new processes need not be spawned for each request. ASPs are Microsoft Corporation's Active Server Pages, a scripting facility that combines HTML scripts with embedded logic that can be developed in non-scripting languages for improved performance and functionality. JSPs are Sun Microsystems, Inc.'s Java Server Pages, a similar scripting technology to ASPs, which combine HTML scripts with portions of Java programs, among other technologies. Of these solutions, scripting has emerged as a popular Web-programming model for reasons related to performance and to the separation of logic from presentation:

Performance: Scripts are interpreted by an engine that is initialized once when the site is started and can continue serving requests until the server is shutdown. Also, most scripting engines cache the parsed scripts. Both of these advantages enable scripting solutions to significantly outperform CGI-based mechanisms.

Separation of logic and presentation: Scripts allow the application logic to be developed independently of the final presentation of a Web page. This significantly simplifies Web site development.

Even with the improvements described above, the cost of dynamically generating Web pages is still very high, which makes it very expensive for Web sites to serve millions of users with dynamic and personalized content. In an attempt to reduce the resources needed to service user requests and to better serve dynamic content, Web sites have resorted to caching.

Caching has emerged as the most important solution for reducing the cost of dynamically generating Web pages. The premise underlying caching is that in many cases, the content of dynamically generated pages does not change very frequently, thereby allowing the accessed pages to be cached. The server caches (locally stores for later retrieval) copies of such dynamically generated Web pages. Conventionally, as shown in FIG. 1 at S11, a client sends a Hypertext Transfer Protocol (HTTP) request for a Web page by, for example, clicking on a hyperlink or by specifying a Universal Resource Locator (URL). As shown at S12, the HTTP request is then received by the server, which then checks its cache to see if the response to the request (the entire requested Web page) is stored in the cache, as shown at S13. As called for by S18, if the requested page is indeed present in the cache and if the response page is still valid, the page is extracted from the cache and sent to the client, as shown at S17. If the entire requested page is not present in the cache or is present but invalid (stale), application logic and/or the Web page's script is executed, as shown at S14. Executing the application logic and/or script may require the server to access data sources such as databases or information feeds, as called for by step S15. Only thereafter may the requested Web page be dynamically generated and sent to the client, as specified in steps S16 and S17. A step of caching the just-generated full page in memory may also be carried out. This mechanism works very well as long as the dynamically generated pages can be cached efficiently (i.e., they are not invalidated very frequently), and the cost of servicing the page from the cache is less than the cost of re-generating the page again. As a result of efficient caching, a Web server uses fewer resources, especially Central Processing Unit resources to service a client's HTTP request. The ability to cache and to efficiently retrieve cached pages improves the server's performance (reduced response time) as well as its capacity to acceptably accommodate a greater number of users than it would otherwise have been able to serve without resorting to caching.

This type of caching is termed "full page caching". This terminology reflects the nature of this form of caching wherein the cache memory contains complete HTML responses; that is, entire Web pages. Herein, an entire Web page corresponds to a single HTTP request. Note that this differs from a Web screen page displayed on a computer screen. Web screen pages may be composed of one or more Web pages independently requested by the logic that generates the display of Web screen pages on computer screens. Full page caching may improve a Web site's overall capacity to handle user traffic. However, this solution is limited in many cases, as the data sources for such dynamically generated pages may change very frequently or unpredictably, making it difficult to positively determine the current validity of the cached page. In many cases, moreover, a Web page refers to more than one data source. Since the granularity of caching is the entire page, changes to data from any one of the data source necessarily results in the invalidation of the entire page, even if the data originating from the other data sources has not changed. This problem is further exacerbated when one or more of the data sources changes very frequently. Indeed, if the Web page's data sources change very frequently, the cost of caching and frequently invalidating the cached entry may be greater than the cost of dynamically generating a new page to service each HTTP request. Because of these problems and the fear of serving stale pages, many Web sites have abandoned full page caching in favor of dynamically generating pages for each incoming request, despite the cost of doing so.

What is needed, therefore, are methods and systems for more efficiently servicing requests for dynamic content. What is also needed are methods and systems for efficiently caching dynamic content and for servicing incoming requests for such dynamic content at least partially by accessing and retrieving the cached content.

SUMMARY OF THE INVENTION

It is, therefore, an object of the present invention to provide methods and systems for more efficiently servicing requests for dynamic content. It is another object of the present invention to provide methods and systems for efficiently caching dynamic content and for servicing incoming requests for such dynamic content at least partially by accessing and retrieving the cached content.

In accordance with the above-described objects and those that will be mentioned and will become apparent below, a method of servicing a request for a document over a computer network, comprises the steps of receiving a request for a document, the document including a script that defines plurality of blocks, each block including a reference to a data source and code that is adapted to access the data source and to format the data accessed from the data source; retrieving at least one of the plurality of blocks defined in the script of the requested document from a memory when the memory stores the at least one of the plurality of blocks defined in the script of the requested document; and dynamically generating any block defined in the script of the requested document that is not stored in the memory and storing a copy of each dynamically generated block in the memory.

According to further embodiments, the method may include a step of assembling the requested document from at least one of the retrieved and dynamically generated blocks. The assembled document may then be sent over the computer network to the originator of the request. Alternatively, the method may include a step of sending at least one of the retrieved and dynamically generated blocks over the computer network to the originator of the request, for local assembly of the requested page therefrom. The document may be or include an Extensible Markup Language (XML) document, such as an HTML document, for example. The request may include an HTTP request. The memory may be or may include a cache memory and may be shared among multiple processes. The method may include a step of determining whether the at least one of the plurality of stored blocks has been invalidated and the retrieving step may be carried out only when the at least one of the plurality of stored blocks has not been invalidated. The method may also include a step of determining an invalidation mechanism and/or an expiration time for each dynamically generated block that may be stored in the memory. A step of storing a placeholder block configured to enable an external data source to asynchronously publish data thereto may also be carried out. The placeholder block may be free of code to access and format data. A step of accepting asynchronous input from an external data source may also be carried out, the asynchronous input updating at least one block stored in the memory. The memory may be maintained across a plurality of cache servers, and a coherency mechanism may maintain coherency of the memory across the plurality of cache servers. The plurality of cache servers may be distributed over a geographical area. The method may further include the steps of associating at least one caching property to each dynamically generated block, the at least one caching property determining when the associated block is invalidated. The caching property(ies) may be stored along with the copy of each dynamically generated block stored in the memory.

According to another embodiment thereof, the present invention is a computer system for servicing a request for a document over a computer network, the system comprising at least one processor; at least one data storage device; a plurality of processes spawned by said at least one processor, the processes including processing logic for receiving a request for a document, the document including a script that defines plurality of blocks, each block including a reference to a data source and code that may be adapted to access the data source and to format the data accessed from the data source; retrieving at least one of the plurality of blocks defined in the script of the requested document from a memory when the memory stores the at least one of the plurality of blocks defined in the script of the requested document; and dynamically generating any block defined in the script of the requested document that may be not stored in the memory and storing a copy of each dynamically generated block in the memory.

The present invention may also be viewed as a machine-readable medium having data stored thereon representing sequences of instructions which, when executed by computing device, causes the computing device to service a request for a document over a computer network, by performing the steps of receiving a request for a document, the document including a script that defines plurality of blocks, each block including a reference to a data source and code that may be adapted to access the data source and to format the data accessed from the data source; retrieving at least one of the plurality of blocks defined in the script of the requested document from a memory when the memory stores the at least one of the plurality of blocks defined in the script of the requested document; and dynamically generating any block defined in the script of the requested document that may be not stored in the memory and storing a copy of each dynamically generated block in the memory.

According to still another embodiment thereof, the present invention is also a method of servicing a request for a Web page over a computer network, comprising the steps of identifying constituent blocks of the Web page, each of the constituent blocks including a portion of the Web page; defining a caching property for each identified block, the caching property defining when each identified block is to be invalidated; caching the identified blocks in a memory; maintaining each of the cached blocks in the memory according to the defined caching property defined for each block, and servicing the request for the Web page at least partially from the cached blocks in memory.

Each of the constituent blocks may include a reference to a data source and code that is adapted to access the data source and to format the data accessed from the data source. The servicing step may include a step of assembling the requested Web page from at least one of the cached blocks and wherein the method may further comprise a step of generating any block of the requested Web page not retrieved from the memory. A step of storing a copy of any generated block in the memory may also be carried out. A step of sending the assembled Web page over the computer network may also be carried out. The caching properties may include a unique identifier, an expiration date, an expiration time and/or an invalidation rule, for example.

BRIEF DESCRIPTION OF THE DRAWINGS

FIG. 3 shows a page script in which cacheable blocks have been identified, according to an embodiment of the present invention.

FIG. 4 shows an illustrative syntax for defining the caching properties of the cacheable blocks, according to an embodiment of the present invention.

DESCRIPTION OF THE INVENTION

Terminology

Figure 1:
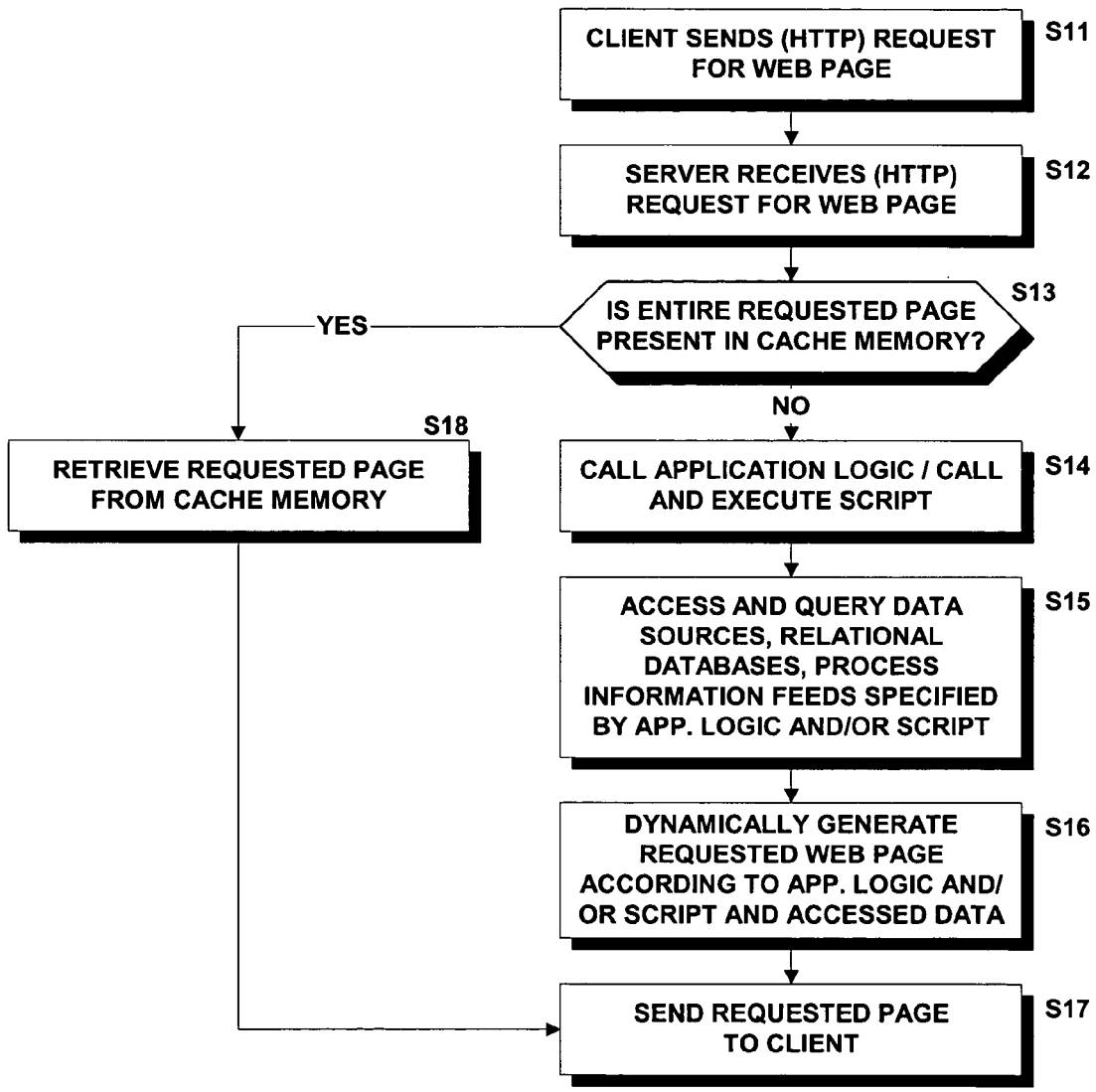
FIG. 1 is a flowchart of a conventional method of generating a Web page.

Page: As used herein, a page is a document, such as an XML or HTML document (such as a Web page, for example) generated by a server (such as a Web server) in response to a single request from a client, such as a HTTP request. The applicability of the present invention, however, is not restricted to HTML responses. For illustrative purposes only, however, a "Page" as used herein means a response from a server, such as an HTML or dynamic HTML (DHTML) Web page. This HTML document may include references to images and/or other rich data sources that may be resolved at the client side and the client may have to issue additional requests to obtain the embedded images, sound, JavaScript code snippets etc.

Page Block or Block: According to the present invention, a document, such as an XML or HTML page, when rendered in a browser on a computer monitor, may be interpreted as a collection of blocks. In the Document Object Model (DOM—a programming interface specification being developed by the World Wide Web Consortium W3C that allows programmers to create and modify HTML pages and XML document as full-fledged programs) of the page, for example, such blocks refer to different nodes of the DOM tree. Page blocks, according to the present invention may also be considered from a higher level. For example, a Web page that contains both stock quotes and an email notification section may be defined in terms of a stock quote block and an email notification block. A Web page, therefore, may be defined in terms of its constituent page blocks.

Functional Description

The present invention is disclosed herein in terms of Web scripting, although the present invention is in no way limited thereto. Conceptually, the present invention includes the caching of HTTP responses at a different level of granularity than is the case when full page caching is utilized. The granularity of caching, according to the present invention, is a "Page Block" (hereafter, "block") instead of a full page. The pages from which blocks are cached may be or include any XML document, for example. However, for simplicity of illustration, the description herein assumes HTML documents.

Broadly, Web scripting is a programming methodology in which application logic is embedded in HTML pages. Such pages with embedded application logic may then be processed by the server (the installation that services the HTTP requests made by a remote client) to generate the requested HTML page that is sent over a computer network such as the Internet to the client browser. ASP and JSP are examples of such technologies.

The present invention is partly predicated upon two observations. The first observation is that even in dynamically generated pages, a significant portion of the Web page is static in nature. Indeed, even the data that is being dynamically generated by querying a database or by some other mechanism has an associated expiration time and may be treated as static data until it expires. The second observation is that when pages are generated using scripting solutions like ASPs or JSPs, each page block is generated by a clearly defined combination of code and static HTML in the script. This enables a one-to-one mapping of the portions of code in the scripted page (and hence the data source) to blocks in the final page.

Figure 2:
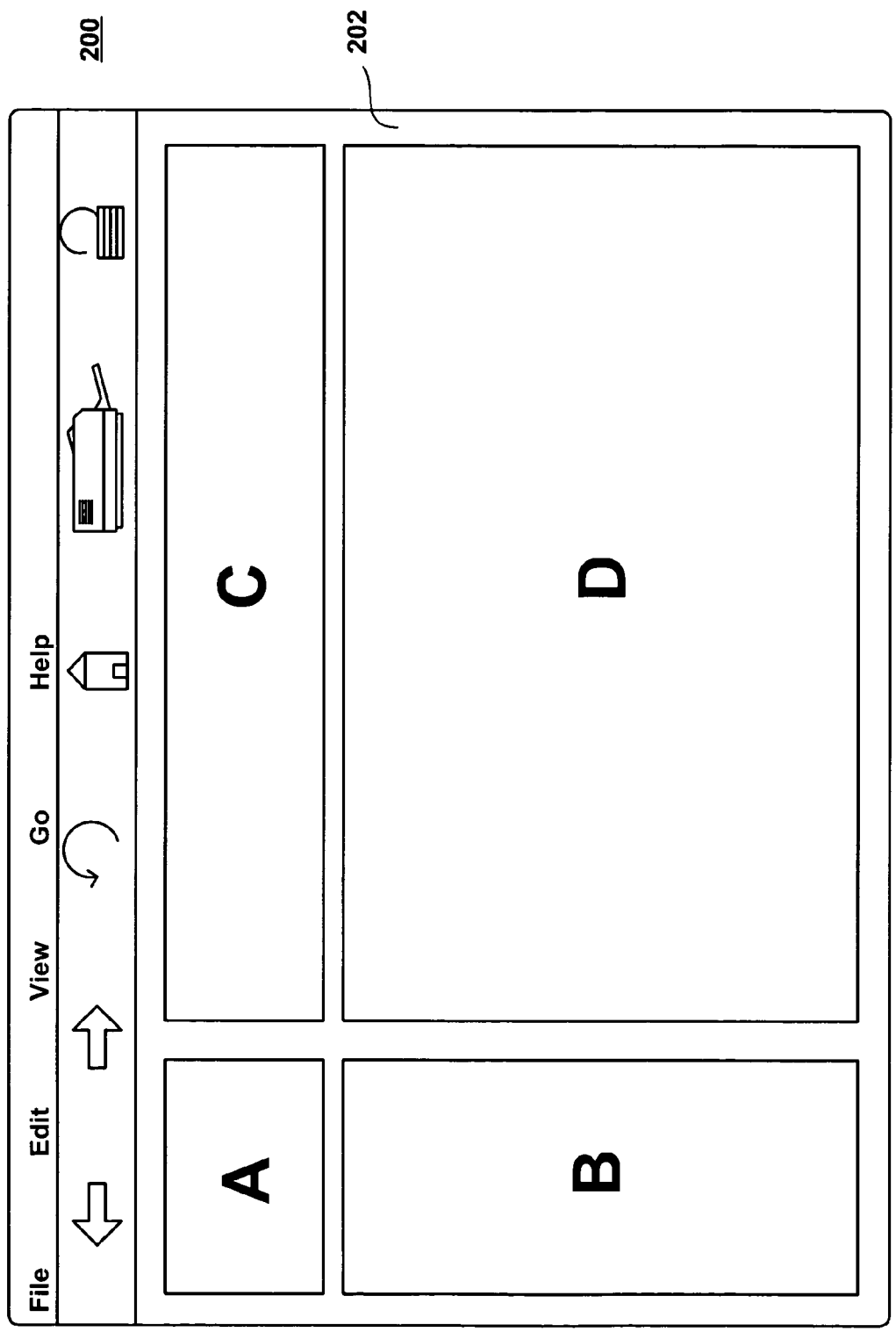
FIG. 2 illustrates a generic Web page divided into blocks, according to an embodiment of the present invention.

For example, a document (such as an XML or HTML document, for example) requested from a Web server from a client browser may include a script that may be defined in terms of a plurality of blocks. FIG. 2 shows a generic browser 200 that displaying a Web page 202. The Web page 202 may be defined and divided in terms of a plurality of blocks, shown in FIG. 2 (for illustrative purposes only) as individual rectangular portions of the active area of the browser 200 and labeled A, B, C and D. The Web page 202, according to the present invention, may include a reference to a data source and code that is adapted to access the data source and to format the data accessed from the data source. For example, the Web page 202 shown in FIG. 2 may be conceptually be defined in terms of a collection of four distinct blocks. For example, block A may display a notification that the user (the person viewing the Web page) has received any new mail. Similarly, block B may include quotes for the stocks in the user's portfolio. Another block, shown at C in FIG. 2, may display the latest news and block D may display a customized user menu along with the user's name. It is to be noted that FIG. 2 is included herewith to illustrate the finer granularity of the partial page caching methodologies of the present invention, relative to full page caching. FIG. 2, therefore, is included herewith for illustrative purposes only and in no way limits the applicability of the present invention.

For example, each of the blocks A, B, C and D may be generated by code present in the underlying script of the document (such as ASP or JSP, for example). The code that generates the email notification A is necessarily distinct from the code in the script that generates the user's personalized stock quotes B. The data sources that are accessed and processed by the blocks A and B are also necessarily different and distinct. In the case of page blocks A and B, the data source for A may include an email server and the data source for page block B may include an external stock ticker information stream that is filtered to extract therefrom only those stock quotes identified by the user as part of the user's stock portfolio, which information may be obtained by querying a database for the User's profile information, for example. The present invention reduces the granularity of caching from full pages to page blocks. Instead of caching the entire page, the present invention caches all or a selected number of blocks of the document (such as a Web page, for example).

According to the present invention, each page block may be assigned or have caching properties associated therewith. The caching properties determine what the block retrieval key for the cached block should be, the invalidation mechanism, the expirations times and the like. For example, the block retrieval key may include a unique identifier that uniquely identifies each cached (stored in memory) block from among all other cached blocks. Relative to the expiration times, for example, the block B that contains the user's stock quotes may have a shorter expiration time than block A that displays mail notifications. Consequently, the cached block B is likely to be invalidated frequently (at least when the stock market is open), whereas block A may only be invalidated after the user has logged on and checked the email listed in the email notification block A. Since the granularity of the cache is at the block level, the caching mechanism according to the present invention is easily able to handle such situations. In case of conventional full page caching, the expiration time for the full page is the minimum of the expiration times for each of the data components thereof. Therefore, if one of the data components of a Web page is changing very frequently or non-deterministically (such as a portion of the Web page that report's the value of the user's stock portfolio or the local weather, for example), the full page cache will not be able to efficiently cache the page, as it would be invalidated very quickly, as the data contained therein stales. In contrast, according to the present invention, only those blocks whose data have changed will be invalidated, while the still-valid cached blocks remain unaffected and fully able to be retrieved and used in assembling a page responsive to an HTTP request. Indeed, responsive to a user-originated HTTP request for that page, the present invention provides for retrieving the cached constituent blocks thereof that are still valid from the cache memory and dynamically generating any block in the script of the requested page that is not stored in the cache memory. A copy of each dynamically generated block may then be stored in the cache memory. The requested page may then be assembled from the retrieved block(s) retrieved from the cache memory and/or the dynamically generated blocks. This assembly may take place at the server that services the user's HTTP request or the constituent blocks of the requested page may be sent over the computer network (e.g., Internet) to be assembled by the client browser (or some combination of these methodologies). It is believed that this process of retrieving blocks from cache memory and only dynamically generating those blocks that are not present in the cache (or present but invalidated) is relatively less costly in terms of server processing time (and ultimately money) than the conventional process of caching entire pages or foregoing the caching altogether in favor of dynamically re-generating each requested document for each request.

From the perspective of a developer, the application of the present invention to a scripting system (such as JSPs, for example) may be a simple two-step process. The first step may include identifying the different blocks of the web page that is generated by the script page. Such identification is fairly straightforward, as each such block has its own data source and code associated therewith. Once the blocks have been identified, the second step is to define the caching properties for each block. The application developer may decide on the expiration times, cache invalidation mechanisms (for example) for each identified block based on the data source and application logic associated for that block. The developer may then apply these attributes to the identified block to be cached. Thereafter, he cache memory may be maintained according to the cache attributes for each block. By applying the cache attributes to the cached (stored) blocks, the cache memory may be transparently maintained and the requested document (such as a Web page, for example) may be populated with such blocks when they can be obtained from the cache instead of executing the code that generates the block.

The present invention is believed to be broadly applicable to (but not limited by) any server-side scripting mechanism such as ASPs, JSPs or Server side JavaScripts, for example. For brevity of illustration, however, the present invention is described hereunder relative to Java Server Pages (JSPs). According to the present invention, partial page caching may be implemented using a cache tag library in JSPs. A sample syntax for the JSP scripting language in an Oracle Application Server (OAS) environment is provided below. OAS implements an n-tier architecture (potentially incorporating a plurality of middle tiers between the client and the back end database(s)) to isolate mission critical application logic. OAS provides HTTP Web Server support, database access, CORBA ORB support, load balancing and pooling, network services like security and directory and message-oriented middleware for facilitating new applications. It is understood, however, that OAS forms no part of the present invention and is referred to herein for illustrative purposes only. Further information regarding OAS may be obtained from Oracle Corp.'s Web site.

According to the present invention, special JSP tag extensions may be defined that allow application developers to specify the caching properties of the constituent blocks in a page, such as an XML document or a Web page. According to the present invention, the application developer need only enclose each block identified as potentially cacheable with such special tags, and specify the caching properties (caching properties define when and the conditions under which the cached blocks are invalidated—if ever) as attributes to these special tags. Reference is now made to FIGS. 3 and 4. In FIG. 3, the exemplary frame displays the script of a Web page, in which two cacheable blocks of code have been identified, referred to in FIG. 3 as Cacheable data block1 and Cacheable data block2. In FIGS. 3 and 4, the term "Body" refers to a block in the script, with code that is adapted to generate the dynamic content either from the a database as the source of data or from an external data source, for example. The exemplary frame illustrated in FIG. 4 displays the page of FIG. 3 after addition of the special tags thereto that allow efficient caching of the constituent blocks of the Web page. In FIG. 4, each of the cacheable data blocks is embedded in an HTML tag extension that identifies the caching properties for that cacheable block. The special tag extension is shown in FIG. 4 by the start tag <Tag Extension> and the end tag </Tag Extension>. The start tag includes the attributes "caching properties", in which the caching properties defining the conditions under which the cacheable data block is to be invalidated are identified.

An administrative interface may be developed (as well as a graphical user interface or GUI) to make the addition of the special tags more transparent to the developer. The different blocks in the JSPs (or the XML document) are preferably uniquely named. Another administrative interface may be developed to specify the caching properties for each block to be stored in the cache memory. In this case, the caching properties for a block may be obtained from an external source. Using a GUI tool, for example, a model may be developed wherein the developer need only highlight a block of code in the script defining the page and mark that block as cacheable.

When the page whose script is shown in FIG. 4 is executed for the first time, a local copy of the content generated by each of the cached blocks (as indicated by "Body") is made before passing the executed block on to the output stream (to be assembled with the other constituent blocks into the requested Web page). This local copy may then be added to the cache and identified by a specific identifier and having the caching properties identified in the special tag attribute, as specified in the tag declaration. During the subsequent execution of this page, the cached block may be retrieved from the cache, if still present therein (it may have been invalidated in the intervening time and the cache flushed). If one or more of the constituent blocks of the requested page are indeed present in the cache, the retrieved block may be used to assemble the requested page if the cached block is still valid (i.e., has not been invalidated), instead of redundantly re-executing the code to generate that block. For illustrative purposes only, an exemplary pseudocode (a readable but formatted description of a process in natural rather than programming language) for the handler process for the special tags may resemble the following:

```
if ( cache "id" is found in the cache storage) {
        get data from the cache
        pass the data to the output stream
            }
else {
        short circuit the output stream to a local buffer
        execute the "Body", the data would be
        available in the local buffer add the data to the cache
        storage to be identified by the identifier and controlled by
        the specified attributes
        remove the short circuit
        add the data in the buffer to the output stream
}
```

Continuing with the example above, to use the JSP extensions in the OAS environment, the Web page must be directed to include the OAS extension tag library. This is done using the JSP <%@ taglib> directive. The syntax for including OAS extension is <%@ taglib uri="oracle.extn.OasExtnRegisterLib" prefix="oas" %>. In the OAS environment, the special tag may be formatted as <oas:cache> and identifies the dynamic content to be cached. The body of the tag is generated during the first access to the block and is retrieved from the cache during subsequent accesses.

In the representative OAS environment developed herein, the syntax of a cacheable block may be as follows and may include one or more of the cache properties included herein:

```
<oas:cache id="cacheName" cacheSpec >
Body to be cached
</oas:cache>
cacheSpec ::= expires="expirationTime" |
```

-continued

```
maxage="validTime" |
invalidate="invalidationTime" |
validator="validatorObj"
```

The <oas:cache> special tag may have the following attributes:

| | |
|---|---|
| Id | The name used to identify the cache instance in the OAS installation. Since the cache's scope is installation-wide, care should be taken that the id (identifier) is kept unique across the installation. Since the enclosed body is executed during the first encounter of this tag, all occurrences should have the same body. The name specified may be case sensitive and shall conform to the current scripting language variable naming conventions. Alternatively, the name could be generated out of a JSP expression. |
| Expires | The time at which the current cache would expire. The syntax for the time value may be Wdy, DD-Mon-YY hh:mm:ss GMT |
| Maxage | The lifetime of the cache in seconds |
| Invalidate | Day of the week or a specific date in the month when the cache becomes invalid. This may be a name value pair identifying the weekday or the date of the month. |

EXAMPLES

A simple cache declaration with hard-coded id (identifier) and expires attribute:

```
<oas:cache id="MyCache" expires="Wed, 14-08-02 10:10:00 GMT" >
Body
</oas:cache>
```

In this example, the page block uniquely identified by the identifier "MyCache", when cached in a cache memory, would expire (become invalid and/or be flushed from the cache memory) on Wednesday, Aug. 8, 2002 at 10:00 Greenwich Mean Time.

A simple cache declaration with maxage attribute:

```
<oas:cache id="Second" maxage="86400" >
Body
</oas:cache>
```

In this example, the maximum age for the block uniquely identified by the identifier "Second", when cached in cache memory, has a maximum age of 86,400 seconds. The "second" page block may become invalidated prior to the expiry of 86,400 seconds, but it may not persist beyond that time limit.

A simple cache declaration with invalidate attribute:

```
<oas:cache id="Third" invalidate="day=Sun" >
Body
</oas:cache>
```

In this example, the page block uniquely identified by the identifier "Third" is invalidated on Sundays. The date in the month in which the block is to be invalidated may be specified using the syntax "date=15", for example. This would invalidate the cached block on the 15$^{th}$ of every month.

Special caching tags may readily be defined with specific cache-invalidation semantics for any of the scripting languages. Web developers may implement these tags to indicate the cacheable blocks of the Web page being served. Advantageously, the cached blocks may be stored in a shared memory cache, making the cache memory available to multiple processes on a machine. According to a further embodiment of the present invention, the cache may also be made distributed, so to render it shareable across machines.

The above examples utilized JSPs to illustrate the partial page caching method of the present invention. The present invention, however, is readily portable and is amenable to application in a variety of areas. For example, partial page caching may be implemented in servicing other types of requests, such as requests for Structured Query language (SQL) documents, such as Oracle Corp.'s XSQL documents. In the case of XSQL, each instance of SQL code in the XSQL document generates data that is dynamic. Using the partial page caching method of the present invention, a developer may specify whether the output of a certain SQL call in the XSQL document should be cached.

Figure 5:
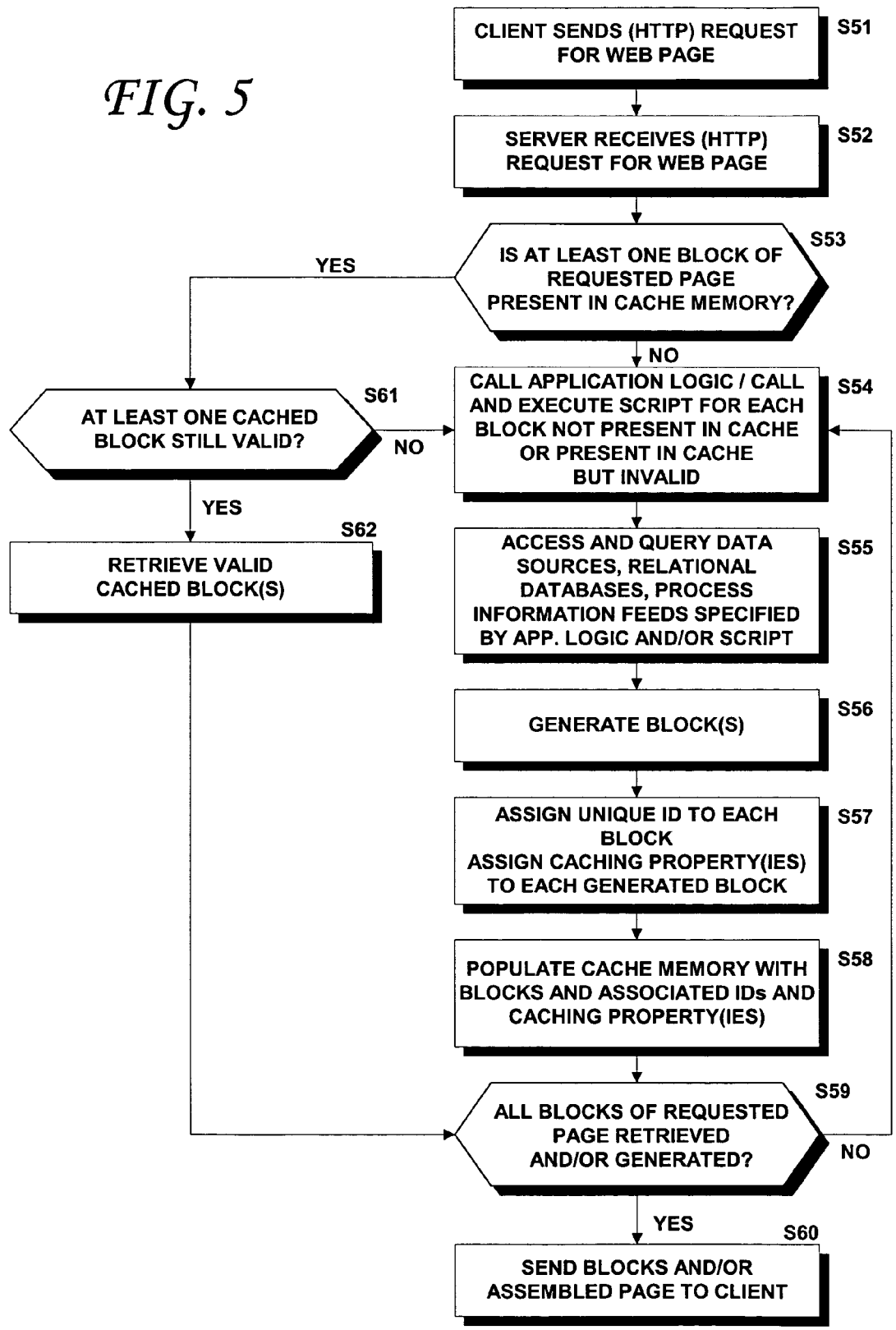
FIG. 5 is a flowchart of the method for partial page caching of dynamically generated content, according to an embodiment the present invention.

FIG. 5 is a flowchart of an embodiment of the method for partial page caching of dynamically generated content, according to the present invention. As shown therein, step S51 calls for a client (such as a Web browser of a computer connected to the Internet, for example) to send an HTTP-formatted request for a Web page. The request is then received by the server at S52. In step S53, it is determined whether at least one block of the requested page (document, Web page, SQL document, etc.) is present in the cache memory. If one or more blocks are indeed present in the cache memory, it is first determined in step S61 whether the cached block(s) of the requested document is/are still valid (have not been invalidated through application of the cache properties to the cached blocks). If the block(s) in cache memory is/are still valid, they are retrieved from cache memory at S62. Alternatively, a process may be defined to police the cache memory and maintain stored therein only those blocks that are still valid and flush the cache of all those blocks that have been or should be invalidated. If such an alternative is employed, step S61 may be skipped, as all blocks stored in the cache memory are necessarily valid.

If the cache memory does not store one or more blocks of the requested page, application logic and/or the script of the requested document is executed for each block not present in the cache memory, or present therein but invalid, as shown at S54. The specified data sources (such as databases, external information feeds, as specified by application logic and/or script) are then accessed and queried as shown at S55 and the data is formatted to dynamically generate the blocks, as shown at S56. A copy of the generated block may then be stored in the cache memory, to enable a later retrieval thereof (instead of re-generating the same block) to service a subsequent request from the same or a different user. According to an embodiment of the present invention, a unique identifier (which may function as the retrieval key for the cached block) and one or more caching properties may then be assigned to the cached block. The block, identifier and caching properties may then be stored in the cache memory, as called for by step S58. In step S59, it is determined whether all constituent blocks of the requested page (document) have been retrieved from cache memory and/or dynamically generated. If not, then steps S54 and subsequent may be repeated until it is determined in step S59 that all constituent blocks of the requested page have been retrieved and/or generated. The retrieved and/or generated blocks may then be sent to the client to be assembled by the browser of the client. Alternatively, the page may be assembled by the server and sent through the computer network to the client, fully assembled and ready to be displayed by the client browser, or some hybrid methodology incorporating elements of each.

It is to be understood that various modifications of the above-detailed steps may occur to those of skill in this art. For example, the dynamically generated blocks may be sent to the client before a copy thereof is stored in the cache memory, to speed up page delivery to the client. Various other block invalidation methods may be implemented to maintain the validity of the cached blocks. For example, many of the known methods for maintaining data or code in cache memories of microprocessors may be applied to the maintenance of the present cache memory for page blocks of the present invention. Various other modifications are possible, and all such modifications are believed to be well within the purview of the present invention.

Figure 6:
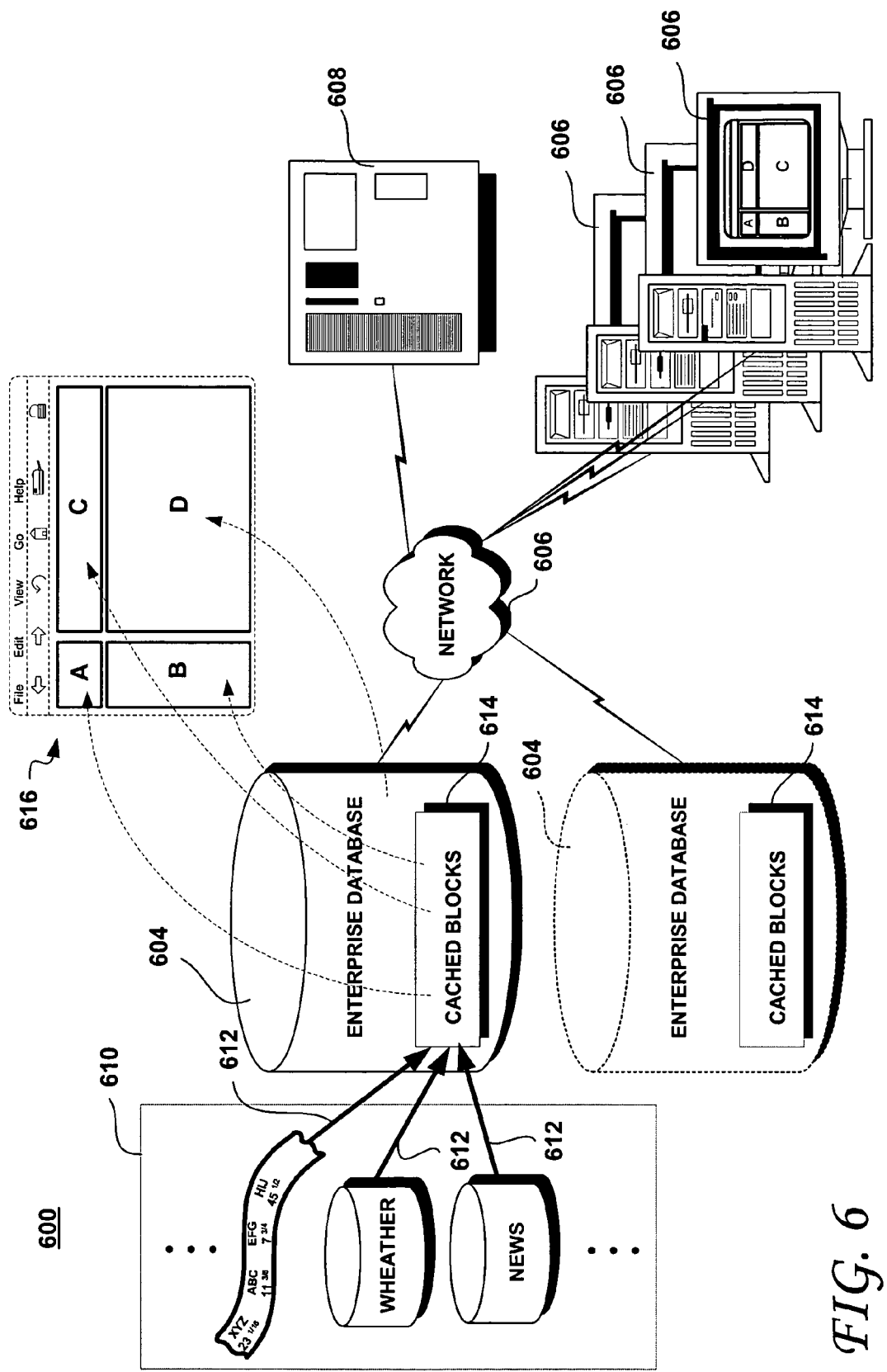
FIG. 6 shows a network and a system suitable for partial page caching of dynamically generated content, according to another embodiment of the present invention.

FIG. 6 shows a network and a system 600 suitable for partial page caching of dynamically generated content, according to another embodiment of the present invention. As shown therein, a computer network 606 (including, for example, the Internet or any private, public or hybrid network) couples one or more Web server computers 608 and one or more client computers (or any network-enabled device) 606. Also coupled to the server 608 is a database, such as an enterprise database 604. The database 604 may be coupled directly to the server 608 or may be coupled thereto through the network 606. The system 600 also includes a cache memory 614. The cache memory 614 may be physically located in the server 608, in the database 604, separate therefrom or several instances thereof may be maintained in a plurality of cache servers (not shown) also coupled to the network 606. According to the present invention, the cache memory 614 may be configured to enable one or more external data sources (collectively referenced by numeral 610 in FIG. 6) to asynchronously publish selected data therein. An Application Program Interface (API) layer (not shown in FIG. 6) may provide an interface to the database 604 and to filter the data streams 612 (representative stock quotes, weather information and news being shown) of the external data sources 610, so as to insure that only the selected data is published into the cache memory 614. For example, only the quotes for selected stocks of interest to the client user may be published to the cache memory 614 and pushed into placeholder blocks (code-less and data-less blocks stored in the cache memory) adapted to receive such published information. According to the present invention, a requested document 616 may be assembled by drawing the constituent blocks (A, B, C and D in the illustrative example shown in FIG. 6) thereof from the cache memory 614 and/or the database 604. The present invention may draw from a single database 604 or a plurality of such databases 604 (as suggested by the database 604 appearing in dashed lines in FIG. 6), distributed over a geographical area and maintained coherent through well-known replication methodologies. Similarly, a plurality of instances of the same cache memories may be utilized, enabling a same Web site to be services through several cache memories 614 and /or several databases 604.

The present partial page (block) caching invention is believed to have many advantages over conventional full page caching solutions. One such advantage is that the present invention may be used in a large number of cases where full page caching may not be effective. This is especially the case in situations in which the various pieces of dynamic data used for generating a page have different expiration times. This is because the expiration time of a full page cached in memory is the earliest of the expiration times of any of the data referred to by the entire page. Therefore, the present invention may reduce the physical size of the cache memory needed on the server, as compared to conventional full page caching. Indeed, one or more stored constituent blocks of a requested page may still be valid when other constituent blocks thereof may have been invalidated and may have been purged from the cache.

The present invention also allows for cross-page caching. In many cases, pages generated for different users must be generated separately, as is the case wherein personalized information is included in the requested page. Pages requested by different users (clients) may, however, may share some page blocks—such as a page block containing the current weather for a common zip code, for example. Partial page caching according to the present invention allows such common blocks to be shared and generated only once.

Example 1

A customer visits an online vendor's e-commerce Web site and browses around the site. If the Web site wishes to display the customer's shopping cart information at all times on all pages that the customer visits, it cannot efficiently cache the response pages if full page caching is used, as the shopping cart information must to be recalculated for every request from the customer. In contradistinction, according to the present invention, the rest of the page (all but the shopping cart) may be advantageously cached. That is, one or more blocks of the requested page, exclusive of the block in which the customer's shopping cart appears, may be cached in memory. For example, blocks that include an item description or user comments on the item may be cached in memory and re-used—not only for subsequent requests from the current user, but for subsequent requests originating from other users as well. The amount of actual code executed for each requested is, therefore, decreased, as most of the data on the page (which, without the present invention would have had to be queried from the database, parsed and formatted) comes straight out of the cache memory in the correct format, in the form of page blocks.

Example 2

An e-commerce Web site wishes to display the customer's name on all the pages accessed by a customer to give the customer a more personalized experience. The message displayed on all of the pages, for example, could be something like "Alok's personal shopper". Even if there is no other information on the page that changes for a given user from request to request, the partial page caching solution according to the present invention is believed to work much better than the conventional methodology of caching full pages. Indeed, using conventional full page caching, the entire page would have to be cached.

In the case wherein two customers (A and B) are looking at the same catalog item, for example, the Web pages that A and B see may be identical, except for the portion thereof that displays the name of the respective customers or other customized information. If conventional full page caching were to be used, two entire pages would have to be cached. If the pages are large, a lot of memory may used, which is an inefficient use of cache memory. When the present partial page caching solution is implemented, however, the block of the page that specifies the customer name may be cached independently of the rest (other constituent blocks) of the page. As a result, there will be only one copy in the cache of block of the page that refers to the item descriptions and the like. This results in much more efficient cache memory utilization.

Moreover, consider the situation in which customer A goes to a page that contains a description of a given item before customer B does so. When customer B later visits the same item's page, the description of the given item, which would already be present in the partial page cache memory of the present invention, does not have to be queried from a database (or obtained from some other data source). Therefore, the block referring to the item's description may be retrieved directly form the cache memory, instead of needing to be generated by reference to the database or some other external data source. In contrast, in the case of conventional full page caching, since the pages sent to customers A and B are treated independently of each other, the same item's description would have to be repeatedly and separately queried from the database. This type of cross-page caching afforded by implementing the present invention may significantly improve a Web site's performance.

The present invention also allows a new "Half Asynchronous, Half Synchronous" programming model to be applied for generating web pages and/or other dynamically generated content, such as XML documents, for example. According to the present invention, a page block that has been marked as cacheable (in a JSP page, for example) need not actually contain any code that outputs data for that page block. Such a page block could function as a "dummy" placeholder. As long as the cache memory maintains an entry for such a placeholder block, the page may be assembled (by a JSP engine, for example) using blocks from the cache memory. As alluded to with reference to FIG. 6, the present invention may expose an API that can be used to publish data directly to the cache. Such an API may be used to publish data for page blocks that have been marked as cacheable, even if those blocks do not actually contain any data or data source. The data (from external sources collectively referenced by numeral 610 in FIG. 6, for example) may be published to the cache memory 614 asynchronously through the cache API and the responses to the HTTP-based clients may be generated synchronously; hence the half asynchronous, half synchronous label applied to such a programming model. The model calls for synchronous responses between the HTTP client and the middle tier (including, for example, the server 608 and/or the database 604 and cache 614) and asynchronous publication between middle-tier and data-source layer referenced at 610 in FIG. 6.

It is believed that the present method of partial page caching significantly reduces resource (CPU and memory) utilization. Instead of expending a large number CPU cycles in generating the seemingly static portion of the dynamic data, the present invention allows the expenditure of a reduced number of cycles to obtain this static portion directly from the cache memory. This economy of CPU cycles can reduce the response time for any client-originated HTTP request and also frees up enough resources so that the database and application server may service a greater number of such requests than would otherwise be possible, thereby achieving increased scalability and speed. Further efficiencies may be achieved by having the cache memory 614 hosted in a Distributed Cache Server, in which multiple installations of the same site may share the cache.

Hardware Description

Figure 7:
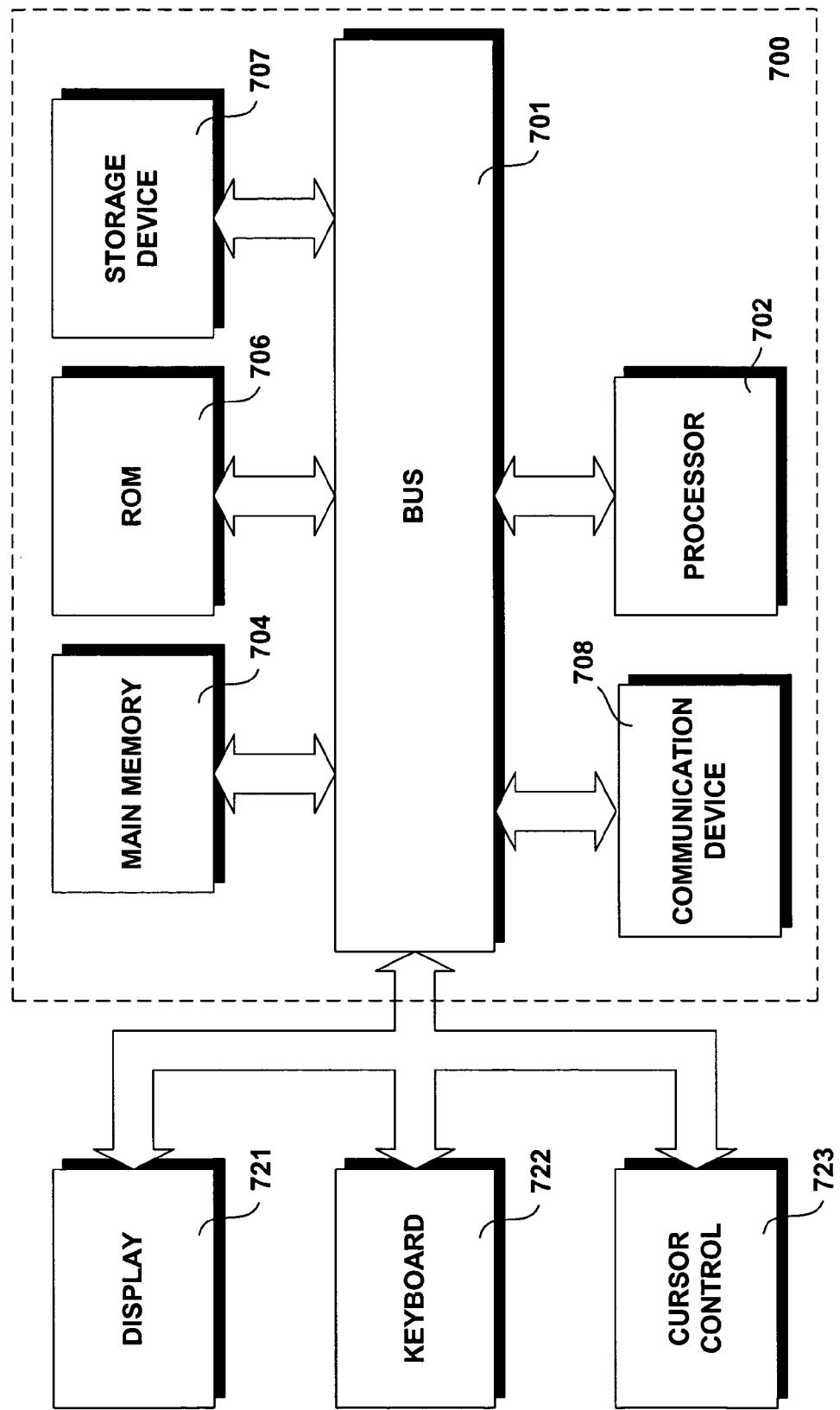
FIG. 7 is a block diagram of a computer with which the present invention may be practiced.

FIG. 7 illustrates a block diagram of a computing device 700 with which an embodiment of the present invention may be implemented. Examples of such computing devices are shown at reference numeral 118 in FIG. 1. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network, such as shown at 112 in FIG. 1.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device may be the user's own voice or cursor control 723, such as a mouse, a trackball, or cursor direction keys for communicating direction information and command selections to processor 702 and for controlling cursor movement on display 721.

The present invention is related to the use of computing device 700 to carry out the partial page caching of dynamically generated content. According to one embodiment, the processing may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method of servicing a request for a document over a computer network, comprising the steps of:

receiving a request for a document, the requested document including a script that defines plurality of blocks, each block including a reference to a data source and code that is adapted to access the data source and to format the data accessed from the data source;

retrieving only some of the plurality of blocks defined in the script of the requested document from a memory, the memory storing the at least one of the plurality of blocks defined in the script of the requested document;

dynamically generating remaining blocks of the plurality of blocks defined in the script of the requested document that were not retrieved from the memory, that are not stored in the memory or that are stored in the memory but have been invalidated and storing a copy of each dynamically generated block in the memory;

assembling the requested document from both the retrieved and dynamically generated blocks, and sending the assembled document over the computer network to an originator of the request.

2. The method of claim 1, further comprising the step of sending at least one of the retrieved and dynamically generated blocks over the computer network to an originator of the request.

3. The method of claim 1, wherein the document includes an XML document.

4. The method of claim 3, wherein the document includes an HTML document.

5. The method of claim 1, wherein the request includes an HTTP request.

6. The method of claim 1, wherein the memory is a cache memory.

7. The method of claim 1, wherein the memory is adapted to be shared among multiple processes.

8. The method of claim 1, further including the step of determining whether the at least one of the plurality of stored blocks has been invalidated and carrying out the retrieving step only when the at least one of the plurality of stored blocks has not been invalidated.

9. The method of claim 1, further comprising the step of determining at least one of an invalidation mechanism and an expiration time for each dynamically generated block that is stored in the memory.

10. The method of claim 1, further comprising the step of storing a placeholder block configured to enable an external data source to asynchronously publish data thereto.

11. The method of claim 10, wherein the placeholder block is free of code to access and format data.

12. The method of claim 1, further comprising the step of accepting asynchronous input from an external data source, the asynchronous input updating at least one block stored in the memory.

13. The method of claim 1, wherein the memory is maintained across a plurality of cache servers, and wherein a coherency mechanism maintains coherency of the memory across the plurality of cache servers.

14. The method of claim 13, wherein the plurality of cache servers are distributed over a geographical area.

15. The method of claim 1, further comprising the steps of associating at least one caching property to each dynamically generated block, the at least one caching property determining when the associated block is invalidated.

16. The method of claim 15, wherein the at least one caching property is stored along with the copy of each dynamically generated block stored in the memory.

17. A computer system for servicing a request for a document over a computer network, comprising:

at least one processor;

at least one data storage device;

a plurality of processes spawned by said at least one processor, the processes including processing logic for:

receiving a request for a document, the requested document including a script that defines plurality of blocks, each block including a reference to a data source and code that is adapted to access the data source and to format the data accessed from the data source;

retrieving only some of the plurality of blocks defined in the script of the requested document from a memory, the memory storing the at least one of the plurality of blocks defined in the script of the requested document;

dynamically generating remaining blocks of the plurality of blocks defined in the script of the requested document that were not retrieved from the memory, that are not stored in the memory or that are stored in the memory but have been invalidated and storing a copy of each dynamically generated block in the memory;

assembling the requested document from both the retrieved and dynamically generated blocks, and sending the assembled document over the computer network to an originator of the request.

18. The computer system of claim 17, further comprising processing logic for sending at least one of the retrieved and dynamically generated blocks over the computer network to an originator of the request.

19. The computer system of claim 17, wherein the document includes an XML document.

20. The computer system of claim 19, wherein the document includes an HTML document.

21. The computer system of claim 17, wherein the request includes an HTTP request.

22. The computer system of claim 17, wherein the memory is a cache memory.

23. The computer system of claim 17, wherein the memory is adapted to be shared among multiple processes.

24. The computer system of claim 17, further including processing logic for determining whether the at least one of the plurality of stored blocks has been invalidated and for carrying out the retrieving step only when the at least one of the plurality of stored blocks has not been invalidated.

25. The computer system of claim 17, further comprising processing logic for determining at least one of an invalidation mechanism and an expiration time for each dynamically generated block that is stored in the memory.

26. The computer system of claim 17, further comprising processing logic for storing a placeholder block configured to enable an external data source to asynchronously publish data thereto.

27. The computer system of claim 26, wherein the placeholder block is free of code to access and format data.

28. The computer system of claim 17, further comprising processing logic for accepting asynchronous input from an external data source, the asynchronous input updating at least one block stored in the memory.

29. The computer system of claim 17, wherein the memory is maintained across a plurality of cache servers, and wherein a coherency mechanism maintains coherency of the memory across the plurality of cache servers.

30. The computer system of claim 29, wherein the plurality of cache servers are distributed over a geographical area.

31. The computer system of claim 17 further comprising processing logic for associating at least one caching property to each dynamically generated block, the at least one caching property determining when the associated block is invalidated.

32. The computer system of claim 31, wherein the at least one caching property is stored along with the copy of each dynamically generated block stored in the memory.

33. A machine-readable storage medium having data stored thereon representing sequences of instructions which, when executed by computing device, causes said computing device to service a request for a document over a computer network, by performing the steps of:

receiving a request for a document, the requested document including a script that defines plurality of blocks, each block including a reference to a data source and code that is adapted to access the data source and to format the data accessed from the data source;

retrieving only some of the plurality of blocks defined in the script of the requested document from a memory, the memory storing the at least one of the plurality of blocks defined in the script of the requested document;

dynamically generating remaining blocks of the plurality of blocks defined in the script of the requested document that were not retrieved from the memory, that are not stored in the memory or that are stored in the memory but have been invalidated and storing a copy of each dynamically generated block in the memory;

assembling the requested document from both the retrieved and dynamically generated blocks, and sending the assembled document over the computer network to an originator of the request.

34. The medium of claim 33, further comprising the step of sending at least one of the retrieved and dynamically generated blocks over the computer network to an originator of the request.

35. The medium of claim 33, wherein the document includes an XML document.

36. The medium of claim 35, wherein the document includes an HTML document.

37. The medium of claim 33, wherein the request includes an HTTP request.

38. The medium of claim 33, wherein the memory is a cache memory.

39. The medium of claim 33, wherein the memory is adapted to be shared among multiple processes.

40. The medium of claim 33, further including the step of determining whether the at least one of the plurality of stored blocks has been invalidated and carrying out the retrieving step only when the at least one of the plurality of stored blocks has not been invalidated.

41. The medium of claim 33, further comprising the step of determining at least one of an invalidation mechanism and an expiration time for each dynamically generated block that is stored in the memory.

42. The medium of claim 33, further comprising the step of storing a placeholder block configured to enable an external data source to asynchronously publish data thereto.

43. The medium of claim 42, wherein the placeholder block is free of code to access and format data.

44. The medium of claim 33, further comprising the step of accepting asynchronous input from an external data source, the asynchronous input updating at least one block stored in the memory.

45. The medium of claim 33, wherein the memory is maintained across a plurality of cache servers, and wherein a coherency mechanism maintains coherency of the memory across the plurality of cache servers.

46. The medium of claim 45, wherein the plurality of cache servers are distributed over a geographical area.

47. The medium of claim 33, further comprising the steps of associating at least one caching property to each dynamically generated block, the at least one caching property determining when the associated block is invalidated.

48. The medium of claim 47, wherein the at least one caching property is stored along with the copy of each dynamically generated block stored in the memory.

49. A method of servicing a request for a Web page over a computer network, comprising the steps of:

identifying constituent blocks of the Web page, each of the constituent blocks including a portion of the Web page;

defining a caching property for each identified block, the caching property defining when each identified block is to be invalidated;

caching the identified blocks in a memory;

maintaining each of the cached blocks in the memory according to the defined caching property defined for each block;

servicing the request for the Web page by retrieving only some of the cached blocks of the requested Web page from the memory and dynamically generating remaining blocks of the constituent blocks of the requested Web page that were not retrieved from the memory, that are not stored in the memory or that are stored in the memory but have been invalidated and storing a copy of each dynamically generated block in the memory;

assembling the Web page from both the retrieved and dynamically generated blocks, and sending the assembled Web page over the computer network.

50. The method of claim 49, wherein each of the constituent blocks includes a reference to a data source and code that is adapted to access the data source and to format the data accessed from the data source.

51. The method of claim 49, further including a step of storing a copy of any generated block in the memory.

52. The method of claim 49, wherein the caching properties include at least one of a unique identifier, an expiration date, an expiration time and an invalidation rule.

* * * * *

UNITED STATES PATENT AND TRADEMARK OFFICE
CERTIFICATE OF CORRECTION

| | | |
|---|---|---|
| PATENT NO. | : 7,509,404 B2 | |
| APPLICATION NO. | : 09/800115 | |
| DATED | : March 24, 2009 | |
| INVENTOR(S) | : Agrawal et al. | |

It is certified that error appears in the above-identified patent and that said Letters Patent is hereby corrected as shown below:

In column 8, line 11, delete "he" and insert -- the --, therefor.

Signed and Sealed this
Twenty-third Day of August, 2011

David J. Kappos
*Director of the United States Patent and Trademark Office*